J. L. SMITH.
Corn Dropper.

No. 103,936. Patented June 7, 1870.

Witnesses:
D. S. Mabee
Alex F. Roberts

Inventor:
J. L. Smith
per Munn & Co
Attorneys.

United States Patent Office.

JAMES L. SMITH, OF PEMBERTON, NEW JERSEY.

Letters Patent No. 103,936, dated June 7, 1870.

IMPROVED CORN-DROPPER.

The Schedule referred to in these Letters Patent and making part of the same.

*To all whom it may concern:*

Be it known that I, JAMES L. SMITH, of Pemberton, in the county of Burlington and State of New Jersey, have invented a new and useful Improvement in Corn-Dropper; and I do hereby declare that the following is a full, clear, and exact description thereof, which will enable others skilled in the art to make and use the same, reference being had to the accompanying drawing.

This invention relates to improvements in corn-droppers, and consists in a tin or other sheet-metal tube of about the proper length for hand use, with a bell-mouth at the top and an enlargement at the bottom, in which enlargement is a cylindrical spreader with a conical top, supported at the center of the space to scatter the grains around the annular space between the outer shell and the spreader, when they rest on the ground; at the top, a handle and seed-box are attached.

Similar letters of reference indicate corresponding parts.

Figure 1:
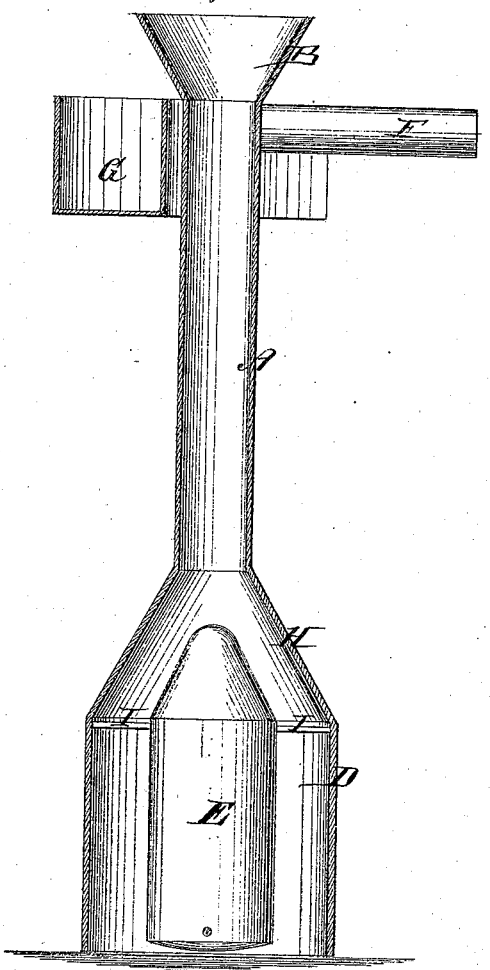
Figure 1 is a sectional elevation of my improved corn-dropper.
Figure 2:
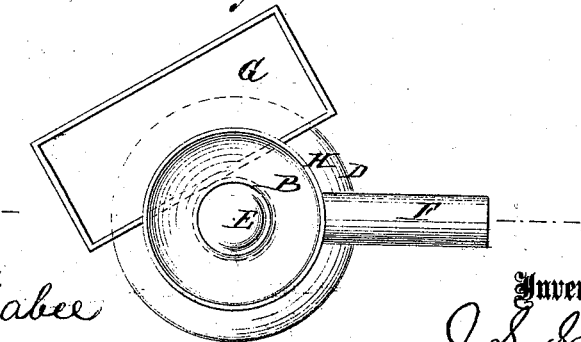
Figure 2 is a top view of the same.

A is the tube;
B, the bell-mouth at the top; and
D, the enlargement at the bottom.

E is the spreader.
F, the handle, and
G is the seed-cup or basket.

The enlargement D is a tube of a diameter as great as that of the area over which it is desirable to have the seed spread, and is connected to the tube A by a conical section, H.

The spreader F may be a block of wood, or it may be of sheet metal, inclosing a hollow space, and is attached to the cylinder D by bars I, as closely as shown.

This improved dropper is made of sufficient length to be used in the ordinary way of using such droppers, by holding it in the hand by the handle, and resting the lower end on the ground at the place where it is desired to have the grain lodge, and dropping the seed into the bell-mouth by hand.

Having thus described my invention,

I claim as new, and desire to secure by Letters Patent—

The improved corn-dropper, herein described, consisting of the tube A, bell-mouth B, cylinder D, conical connection H, spreader E, handle and seed-cup, all constructed and arranged substantially as specified.

JAMES L. SMITH.

Witnesses:
BENUJUT ANTRIM,
RUSLING MALSBURY.